United States Patent
Rajagopalan et al.

(10) Patent No.: US 12,432,228 B2
(45) Date of Patent: Sep. 30, 2025

(54) PROVIDING NEAR-FIELD COMMUNICATION SECURITY USING SMART CYBER CONTRACT GENERATION FOR A ZERO-TRUST NETWORK ARCHITECTURE

(71) Applicant: Bank of America Corporation, Charlotte, NC (US)

(72) Inventors: Anurajam Rajagopalan, Vengaivasal (IN); Durga Prasad Kutthumolu, Hyderabad (IN); Subburathinam Krishnan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 246 days.

(21) Appl. No.: 18/230,786

(22) Filed: Aug. 7, 2023

(65) Prior Publication Data
US 2025/0055856 A1    Feb. 13, 2025

(51) Int. Cl.
*H04L 9/40* (2022.01)
*G06N 20/00* (2019.01)

(52) U.S. Cl.
CPC ......... *H04L 63/1416* (2013.01); *G06N 20/00* (2019.01); *H04L 63/1425* (2013.01)

(58) Field of Classification Search
CPC .. H04L 63/1416; H04L 63/1425; G06N 20/00
See application file for complete search history.

(56) References Cited

U.S. PATENT DOCUMENTS

| | | |
|---|---|---|
| 11,190,579 B1 | 11/2021 | Barton et al. |
| 11,516,199 B2 | 11/2022 | Barton et al. |
| 11,689,373 B2 | 6/2023 | Hawkins et al. |
| 2019/0394243 A1 | 12/2019 | Wiig et al. |
| 2021/0352139 A1 | 11/2021 | Madisetti et al. |
| 2022/0021711 A1 | 1/2022 | Marsh et al. |
| 2022/0103584 A1 | 3/2022 | Tobin |

(Continued)

OTHER PUBLICATIONS

An Overview of Near Field Communication (NFC) https://www.google.com/url?sa=t&rct=j&q=&esrc=s&source=web&cd=&cad=rja&uact=8&ved=2ahUKEwjY2LLa37j9AhVOVHwKHQYhA_sQFnoECCEQAQ&url=https%3A%2F%2Fwww.ijser.org%2Fresearchpaper%2FAn-Overview-of-Near-Field-Communication-NFC.pdf&usg=AOvVaw1jWzoZ618aThZ_Sfhw-kbl.

(Continued)

*Primary Examiner* — Nam T Tran
(74) *Attorney, Agent, or Firm* — Banner & Witcoff, Ltd.

(57) ABSTRACT

Arrangements for providing near-field communication (NFC) security using smart cyber contract generation (SCC) are provided. A platform may train an anomaly detection engine based on historical user information and an SCC generation engine based further on historical event processing rules. The platform may generate a certificate for a user device based on intercepting a request via NFC. The platform may validate the certificate based on a maintained profile. The platform may generate a suspicion indication for the request using the anomaly detection engine. The platform may generate an SCC, using the SCC generation engine, based on identifying the request is suspicious. The platform may apply rules included in the SCC to information included in the request. Based on determining that less than all of the rules in the SCC are satisfied, the platform may initiate a security action. The platform may update the engines based on updated event processing permissions.

20 Claims, 9 Drawing Sheets

(56) References Cited

U.S. PATENT DOCUMENTS

| | | | |
|---|---|---|---|
| 2022/0232024 A1 | 7/2022 | Kapoor et al. | |
| 2022/0232025 A1 | 7/2022 | Kapoor et al. | |
| 2022/0270725 A1 | 8/2022 | DeRosa-Grund | |
| 2022/0272128 A1 | 8/2022 | Babaei | |
| 2022/0329616 A1 | 10/2022 | O'Hearn et al. | |
| 2022/0368621 A1 | 11/2022 | Simanavicius et al. | |
| 2023/0034771 A1 | 2/2023 | Dalton | |
| 2023/0075355 A1 | 3/2023 | Twigg et al. | |
| 2023/0124157 A1 | 4/2023 | Mikonis et al. | |
| 2023/0124755 A1 | 4/2023 | Mikonis et al. | |
| 2023/0216658 A1 | 7/2023 | Barnes et al. | |
| 2023/0216947 A1 | 7/2023 | Bernardi | |
| 2023/0229787 A1 | 7/2023 | Mahdavipour et al. | |
| 2024/0211564 A1* | 6/2024 | Fields | G06V 40/33 |
| 2025/0039137 A1* | 1/2025 | Singh | H04L 63/1425 |

OTHER PUBLICATIONS

Strengths and Weaknesses of Near Field Communication https://globaljournals.org/GJCST_Volume11/7-Strengths-and-Weaknesses-of-Near-Field-Communication.pdf.

* cited by examiner

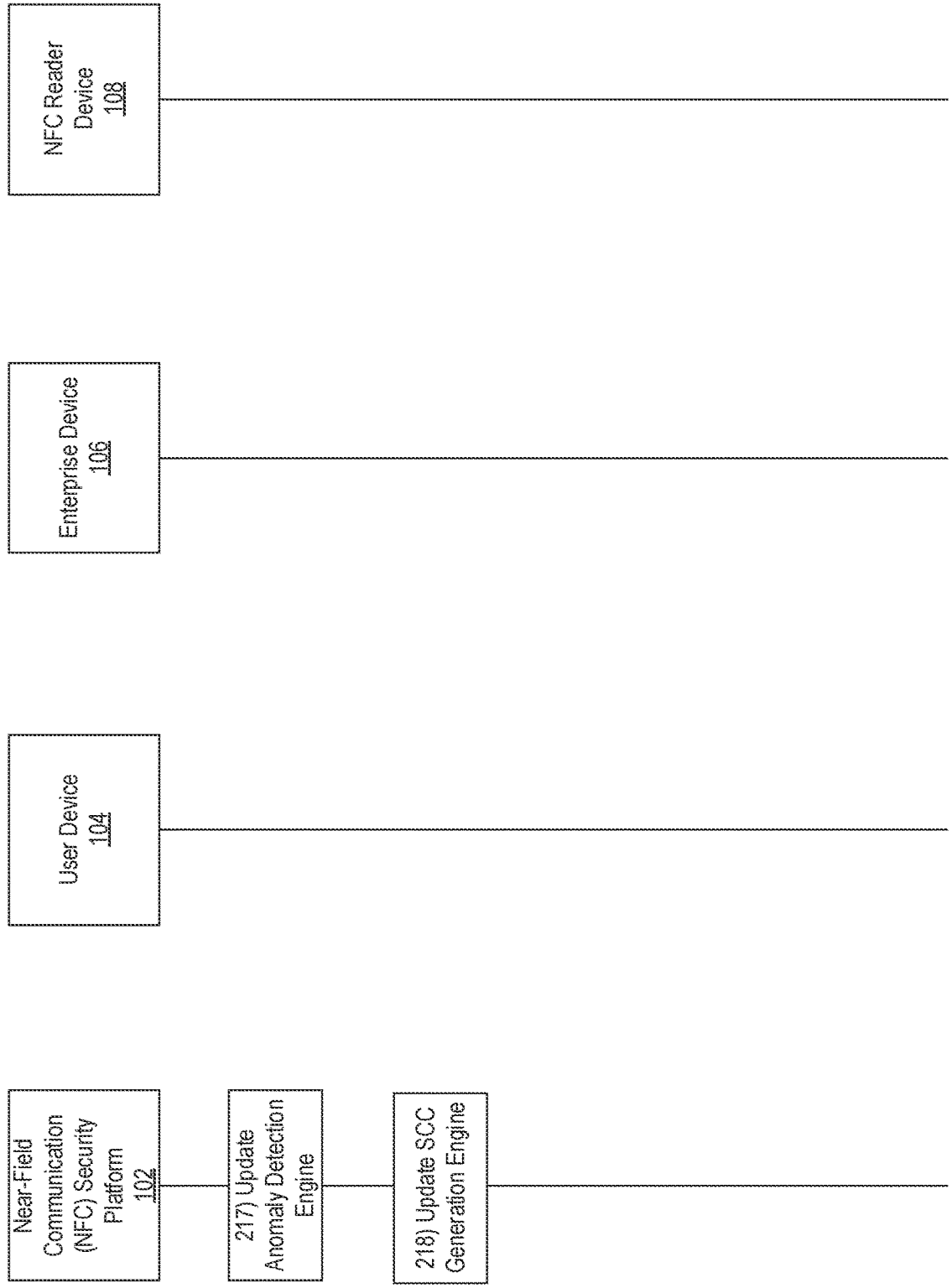

300

Security Alert Interface

Notification: Event Processing Request Flagged Suspicious
Smart Cyber Contract Result: Contract Not Satisfied
Request Source: First User Device
Associated Profile: Customer 1
Rules Applied: Account Balance, Source Device, Request Amount
Rules Satisfied: Account Balance, Source Device Update Event Processing Permissions?

[ Yes ]   [ No ]

FIG. 3

PROVIDING NEAR-FIELD COMMUNICATION SECURITY USING SMART CYBER CONTRACT GENERATION FOR A ZERO-TRUST NETWORK ARCHITECTURE

BACKGROUND

Aspects of the disclosure relate to providing security for systems implementing near-field communications by using smart cyber contracts and a zero-trust network architecture. In some instances, a system may use near-field communication (NFC) technology to provide convenient contactless information transfers (e.g., contactless payment using an NFC device, and/or other functions). Contactless information transfers using NFC technology may be susceptible to various cyber threats (e.g., network eavesdropping, interception attacks, direct invocation attacks, or the like) which may compromise sensitive information included in the transfer. Accordingly, it may be important to provide improved methods of securing NFC systems and defend against cyber threats.

SUMMARY

Aspects of the disclosure provide effective, efficient, scalable, and convenient technical solutions that address and overcome the technical problems associated with providing NFC security. In accordance with one or more arrangements of the disclosure, a computing platform with at least one processor, a communication interface, and memory storing computer-readable instructions may train an anomaly detection engine based on historical user information. Training the anomaly detection engine may configure the anomaly detection engine to output suspicion indications based on input of event processing information. The computing platform may train a smart cyber contract (SCC) generation engine based on the historical user information and historical event processing rules. Training the SCC generation engine may configure the SCC generation engine to output smart cyber contracts based on input of maintained profile information. The computing platform may generate a first certificate for a first user device based on intercepting an event processing request from the first user device. The event processing request may include first event processing information. The computing platform may validate the first certificate based on a maintained profile associated with the first user device. The computing platform may input the first event processing information into the anomaly detection engine to generate a suspicion indication based on validating the first certificate. The computing platform may generate a suspicion indication identifying the event processing request as suspicious, based on comparing the first event processing information to the historical user information. The computing platform may generate a first smart cyber contract by inputting maintained profile information into the SCC generation engine, based on a suspicion indication identifying the event processing request as suspicious. The computing platform may apply one or more rules included in the first smart cyber contract to the first event processing information to determine whether the first event processing information satisfies the one or more rules. The computing platform may initiate a security action based on a determination that the first event processing information fails at least one rule of the one or more rules.

In one or more examples, the computing platform may receive event processing permissions in response to initiating the security action. The computing platform may update the anomaly detection engine based on the first event processing information and the event processing permissions. The computing platform may update the SCC generation engine based on the first event processing information, the first smart cyber contract, and the event processing permissions.

In one or more instances, the computing platform may generate a second certificate for a second user device based on intercepting an event processing request from the second user device. The event processing request from the second user device may include second event processing information. The computing platform may validate the second certificate based on a maintained profile associated with the second user device. The computing platform may input the second event processing information into the anomaly detection engine to generate a second suspicion indication, based on validating the second certificate. The computing platform may generate a second suspicion indication identifying the event processing request from the second user device as safe, based on comparing the second event processing information to the historical user information. The computing platform may cause processing of the event processing request from the second user device, based on the second suspicion indication.

In one or more examples, the computing platform may generate a second certificate for a second user device based on intercepting an event processing request from the second user device. The event processing request from the second user device may include second event processing information. The computing platform may validate the second certificate based on a maintained profile associated with the second user device. The computing platform may input the second event processing information into the anomaly detection engine to generate a second suspicion indication, based on validating the second certificate. The computing platform may generate a second suspicion indication identifying the event processing request from the second user device as suspicious, based on comparing the second event processing information to the historical user information. The computing platform may generate a second smart cyber contract by inputting second maintained profile information into the SCC generation engine, based on the second suspicion indication identifying the event processing request from the second user device as suspicious. The computing platform may apply one or more rules included in the second smart cyber contract to the second event processing information to determine whether the second event processing information satisfies the one or more rules included in the second smart cyber contract. The computing platform may cause processing of the second event processing request, based on a determination that the second event processing information satisfies the one or more rules included in the second smart cyber contract.

In one or more instances, the suspicion indication may be a binary value. In one or more examples, the suspicion indication may be a confidence score. The suspicion indication may identify the event processing request as suspicious based on the confidence score satisfying a confidence threshold. In one or more instances, the computing platform may dynamically update the SCC generation engine based on the computing platform receiving updated event processing rules. Updating the SCC generation engine may cause the SCC generation engine to output smart cyber contracts comprising one or more updated event processing rules. In one or more examples, the security action may be and/or include at least one of: output of a suspicion notification to the first user device, output of instructions to deny the event processing request, or output of a security alert to an event processing entity.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for providing NFC security using smart cyber contract generation for a zero-trust network architecture in accordance with one or more example arrangements;

FIG. 3 depicts an illustrative graphical user interface depicting an example security alert generated in response to detecting a breach in NFC security using smart cyber contract generation for a zero-trust network architecture in accordance with one or more example arrangements.

DETAILED DESCRIPTION

Figure 1A:
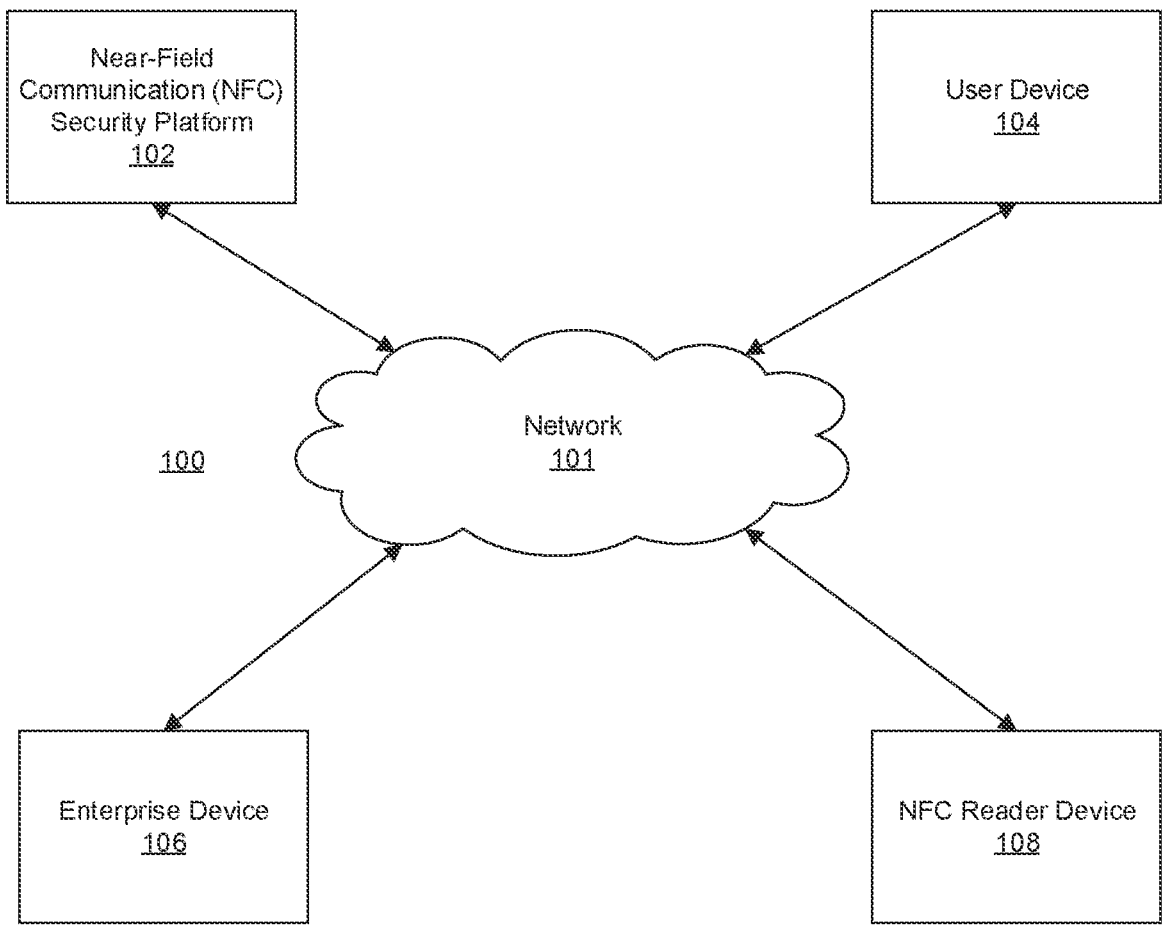
FIGS. 1A-1B depict an illustrative computing environment for providing NFC security using smart cyber contract generation for a zero-trust network architecture in accordance with one or more example arrangements.

In the following description of various illustrative arrangements, reference is made to the accompanying drawings, which form a part hereof, and in which is shown, by way of illustration, various arrangements in which aspects of the disclosure may be practiced. In some instances, other arrangements may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, some aspects of the disclosure relate to a system for providing NFC security using smart cyber contract generation for a zero-trust network architecture. Service providers (e.g., an enterprise organization, such as a financial institution and/or other institutions) may implement an NFC system providing contactless communication services (e.g., contactless payments, and/or other services) to users (e.g., customers of the enterprise organization, and/or other users). This NFC system may utilize centralized (e.g., methods involving third party vendors, a central connection point for systems at diverse locations, or the like) and/or decentralized (e.g., methods involved secured distributed ledgers, or the like) communication methods. The NFC system may implement one or more conventional security measures to protect a network by detecting threats (e.g., scanning for unauthorized transfers and/or requests, passwords and/or authentication methods, and/or other conventional methods of securing an NFC system). Overall, this system of implementing and protecting an NFC system is ripe for improvement, because new methods of attacking contactless communications are constantly being developed or evolving (e.g., monitoring unsecured channels of communication to extract sensitive information, network eavesdropping attacks on the network, data manipulation to give the appearance a malicious actor possesses certain credentials, and/or other methods).

There exists a strong need to provide reliable systems and arrangements for providing NFC security. Such systems and arrangements may include a system that uses a zero-trust network architecture that requires validating at each level of a digital communication using the network. For example, any given request (e.g., an event processing request, or the like) to access and/or otherwise use information via a communication system (e.g., an NFC system, or the like) utilizing the zero-trust network architecture (ZTNA) requires dynamic authentication to ensure resources (e.g., event processing information, user account information, and/or other resources) remain secure. Systems utilizing a ZTNA are designed to provide "minimum required access" (e.g., access to information is given only to a minimum number of users and/or systems required to complete a valid request). However, even security measures such as a ZTNA are susceptible to attack. For example, an NFC system utilizing a ZTNA that requires authentication at each level of, e.g., an event processing request but which uses the same authentication method at each level may be vulnerable to a single cyber threat designed to work around the particular authentication method. Accordingly, a system may provide multiple different layers of security for a ZTNA. For example, the system may utilize one or more of: certificate-based identity authentication, anomaly detection methods, smart cyber contracts, and/or other methods of providing security to an NFC network. In some instances, the system may use an anomaly detection engine trained on historical event processing information to identify whether a current event processing request warrants a suspicion indication flagging the request as a potential cyber threat. The system may also implement a smart cyber contract (SCC) generation engine configured to generate dynamic SCCs based on historical event processing information and historical event processing rules. Dynamic SCCs may allow the use of customized rules to validate different event processing requests when a given request is flagged as suspicious.

Service providers may utilize the system described above by generating a personalized certificate for users of the service provider's NFC system. The personalized certificates may be used as an initial form of authentication (e.g., to identify legitimate users, identify legitimate user devices, confirm access to a secured application, and/or other methods of authentication) when an event processing request is received via an NFC device. The system may subsequently utilize an anomaly detection method (e.g., the anomaly detection engine described above, or the like) to determine whether the event processing request is suspicious (e.g., based on historical event processing information related to the user associated with the personalized certificate). The system may further utilize SCCs (e.g., by using an SCC generation engine as described above, and/or other methods) to validate suspicious event processing requests, such as by applying security and/or validation rules included in an SCC. In doing so, the system may provide a multi-tiered method of providing NFC security utilizing a ZTNA and dynamic SCCs.

For example, the system may utilize a computing platform configured to monitor interactions between user devices and NFC devices. When a communication (e.g., an event processing request, or the like) is received by the NFC device, the platform may intercept the communication and begin sending the request through the various tiers of security described above. For instance, based on validating a certificate associated with a user and/or user device that initiated the communication, the platform may use an anomaly detection engine to determine if the communication is suspicious. Based on determining that the communication is suspicious, the platform may generate and/or update an SCC using an SCC generation engine and apply one or more rules included in the SCC to the communication. Based on all of the rules being satisfied, the platform may identify that all of the requirements of the ZTNA are satisfied, and send the communication on to its original destination. Alternatively, based on determining that one or more of the rules were not satisfied, the platform may initiate a security action to protect the NFC system. In some instances, the platform may update the anomaly detection engine and/or the SCC generation engine based on information associated with the communication (e.g., user information, account information, event processing information, and/or other information) and/or particular permissions (e.g., event processing permissions) received in response to initiating a security action.

Figure 1B:
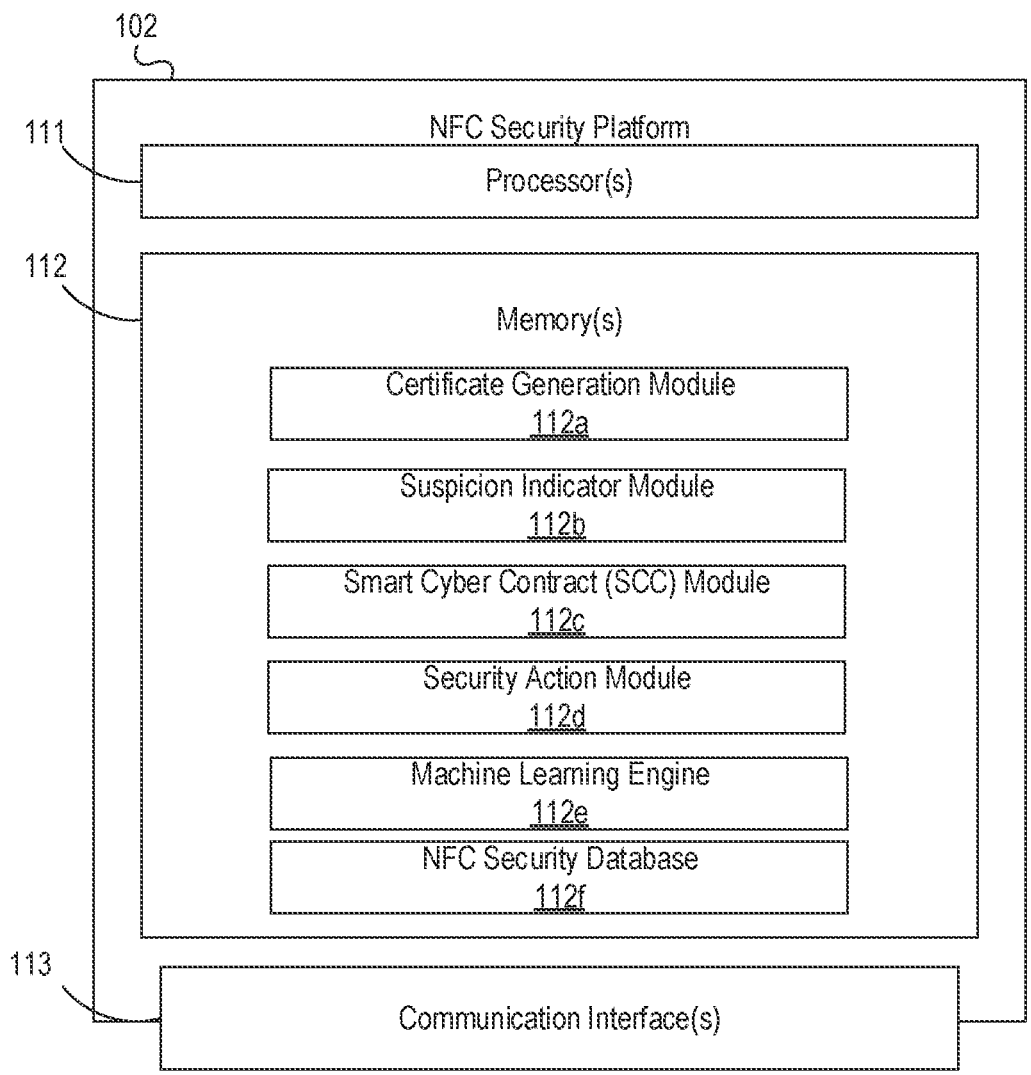

FIGS. 1A-1B depict an illustrative computing environment for providing NFC security using smart cyber contract generation for a zero-trust network architecture in accordance with one or more example arrangements. Referring to FIG. 1A, computing environment 100 may include one or more computer systems. For example, computing environment 100 may include a near-field communication (NFC) security platform 102, a user device 104, enterprise device 106, and an NFC reader device 108.

As described further below, NFC security platform 102 may be a computer system that includes one or more computing devices (e.g., servers, laptop computer, desktop computer, mobile device, tablet, smartphone, and/or other devices) and/or other computer components (e.g., processors, memories, communication interfaces) that may be used to configure, train and/or execute one or more machine learning models (e.g., an anomaly detecting engine, a smart cyber contract (SCC) generation engine, or the like). For example, the NFC security platform 102 may train the one or more machine learning models to generate suspicion indications based on event processing information (which may, e.g., be associated with an event processing request sent by an NFC device). Additionally, in some instances, the NFC security platform 102 may train the one or more machine learning models to generate dynamic SCCs based on maintained profile information (e.g., information associated with a customer of an enterprise organization). In some examples, the NFC security platform 102 may be further configured to monitor interactions between one or more additional computing devices (e.g., user device 104, enterprise device 106, NFC reader device 108, and/or other computing devices). In some instances, NFC security platform 102 may be controlled or otherwise maintained by an enterprise organization (e.g., a financial institution, and/or other institutions). In one or more examples, the NFC security platform 102 may be configured to communicate with one or more systems (e.g., user device 104, enterprise device 106, NFC reader device 108, and/or other systems) to perform an information transfer, display an interface, initiate a security action, and/or perform other functions.

User device 104 may be a computing device (e.g., laptop computer, desktop computer, mobile device, tablet, smartphone, and/or other device) and/or other information storing or computing component (e.g., processors, memories, communication interfaces, databases) that may be used to transfer information between users and/or perform other user functions (e.g., sending an event processing request, displaying an alert, and/or other functions). Additionally or alternatively, in one or more examples, user device 104 may be an electronic chip (e.g., an NFC tag) with one or more components (e.g., processors, memory, communication interfaces) embedded in a housing (e.g., a card, a puck, and/or other housings) configured to perform NFC information transfers with one or more systems (e.g., NFC security platform 102, NFC reader device 108, or the like). In one or more instances, user device 104 may correspond to a first user (who may, e.g., be client of the enterprise organization, such as a financial institution and/or other institution). In one or more instances, the user device 104 may be configured to communicate with one or more systems (e.g., NFC security platform 102, enterprise device 106, and/or other systems) to perform an information transfer, send and receive digital communications, and/or to perform other functions. In some instances, the user device 104 may be configured to display one or more graphical user interfaces (e.g., security alert interfaces, and/or other interfaces). Although shown as a single user device, it should be understood that, in some instances, one or more additional user devices similar to user device 104 may be included in computing environment 100.

Enterprise device 106 may be a computing device (e.g., laptop computer, desktop computer, mobile device, tablet, smartphone, server, server blade, and/or other device) and/or other information storing or computing component (e.g., processors, memories, communication interfaces, databases), similar to user device 104, that may be used to transfer information between users and/or perform other user functions (e.g., processing an event processing request, displaying an alert, and/or other functions). In one or more instances, enterprise device 106 may correspond to a second user (who may, e.g., be an employee of the enterprise organization, such as a financial institution and/or other institution). In one or more instances, the enterprise device 106 may be configured to communicate with one or more systems (e.g., NFC security platform 102, NFC reader device 108, and/or other systems) to perform an information transfer, send and receive digital communications, and/or to perform other functions. In some instances, the enterprise device 106 may be configured to display one or more graphical user interfaces (e.g., security alert interfaces, and/or other interfaces). Although shown as a single user device, it should be understood that, in some instances, one or more additional user devices similar to enterprise device 106 may be included in computing environment 100.

NFC reader device 108 may be a computing device (e.g., laptop computer, desktop computer, mobile device, tablet, smartphone, and/or other device) and/or other information storing or computing component (e.g., processors, memories, communication interfaces, databases), similar to user device 104, that may be used to transfer information between devices and/or perform other functions (e.g., receiving an event processing request via NFC, and/or other functions). In one or more examples, the NFC reader device 108 may be and/or connect to an NFC reader device configured to send and/or receive NFC requests from one or more user devices (e.g., user device 104, enterprise device 106, and/or other devices). In one or more instances, NFC reader device 108 may correspond to an entity (e.g., such as a commercial vendor and/or other organization, and/or an individual unaffiliated with the enterprise organization associated with user device 104 and/or enterprise device 106). In one or more instances, the NFC reader device 108 may be configured to communicate with one or more systems (e.g., NFC security platform 102, enterprise device 106, and/or other systems) to perform an information transfer, send and receive digital communications, and/or to perform other functions. Although shown as a single device, it should be understood that, in some instances, one or more additional devices similar to NFC reader device 108 may be included in computing environment 100.

Computing environment 100 also may include one or more networks, which may interconnect NFC security platform 102, user device 104, enterprise device 106, and NFC reader device 108. For example, computing environment 100 may include a network 101 (which may interconnect, e.g., NFC security platform 102, user device 104, enterprise device 106, and NFC reader device 108). In some instances, the network 101 may include interaction information (e.g., information corresponding to authentication attempts, information transfers, and/or other information) between one or more devices connected via the network 101.

In one or more arrangements, NFC security platform 102, user device 104, enterprise device 106, and NFC reader device 108 may be any type of computing device capable of sending and/or receiving requests and processing the requests accordingly. For example, NFC security platform 102, user device 104, enterprise device 106, and NFC reader device 108, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of NFC security platform 102, user device 104, enterprise device 106, and NFC reader device 108, may, in some instances, be special-purpose computing devices configured to perform specific functions.

Referring to FIG. 1B, NFC security platform 102 may include one or more processors 111, memory 112, and communication interface 113. An information bus may interconnect processor 111, memory 112, and communication interface 113. Communication interface 113 may be a network interface configured to support communication between NFC security platform 102 and one or more networks (e.g., network 101, or the like). Communication interface 113 may be communicatively coupled to the processor 111. Memory 112 may include one or more program modules having instructions that, when executed by processor 111, cause NFC security platform 102 to perform one or more functions described herein and/or one or more databases (e.g., an NFC security Database 112f, or the like) that may store and/or otherwise maintain information which may be used by such program modules and/or processor 111. In some instances, the one or more program modules and/or databases may be stored by and/or maintained in different memory units of NFC security platform 102 and/or by different computing devices that may form and/or otherwise make up NFC security platform 102. For example, memory 112 may have, host, store, and/or include a certificate generation module 112a, suspicion indicator module 112b, smart cyber contract (SCC) module 112c, security action module 112d, machine learning engine 112e, and/or NFC security database 112f.

Certificate generation module 112a may have instructions that direct and/or cause NFC security platform 102 to generate a personal and/or customized certificate for users (e.g., clients of an enterprise organization associated with NFC security platform 102, such as a financial institution and/or other institutions), and/or perform other certificate generation functions. Suspicion indicator module 112b may have instructions that direct and/or cause NFC security platform 102 to generate a suspicion indicator for an event processing request (e.g., using an anomaly detection engine, and/or by other methods). SCC module 112c may have instructions that direct and/or cause NFC security platform 102 to generate and/or output one or more dynamic SCCs (e.g., using an SCC generation engine, and/or by other methods). Security action module 112d may have instructions that direct and/or cause NFC security platform 102 to initiate one or more security actions (e.g., as a result of an event processing request failing to satisfy one or more security rules included in an SCC). Machine learning engine 112e may contain instructions causing NFC security platform 102 to train, implement, and/or update one or more machine learning models, such as an anomaly detection engine, (that may, e.g., be used to detect anomalies in an event processing request and generate a suspicion indication), an SCC generation engine (that may, e.g., be used to generate dynamic SCCs containing rules to be applied to suspicious event processing requests), and/or other models. In some instances, machine learning engine 112e may be used by NFC security platform 102 to refine and/or otherwise update methods for providing NFC security using smart contract generation for a ZTNA, and/or other methods described herein. NFC security database 112f may have instructions causing NFC security platform 102 to store certificates, event processing request information, dynamic SCCs, and/or other information (that may, e.g., be used to generate suspicion indications and/or dynamic SCCs using one or more machine learning models).

Figure 2A:
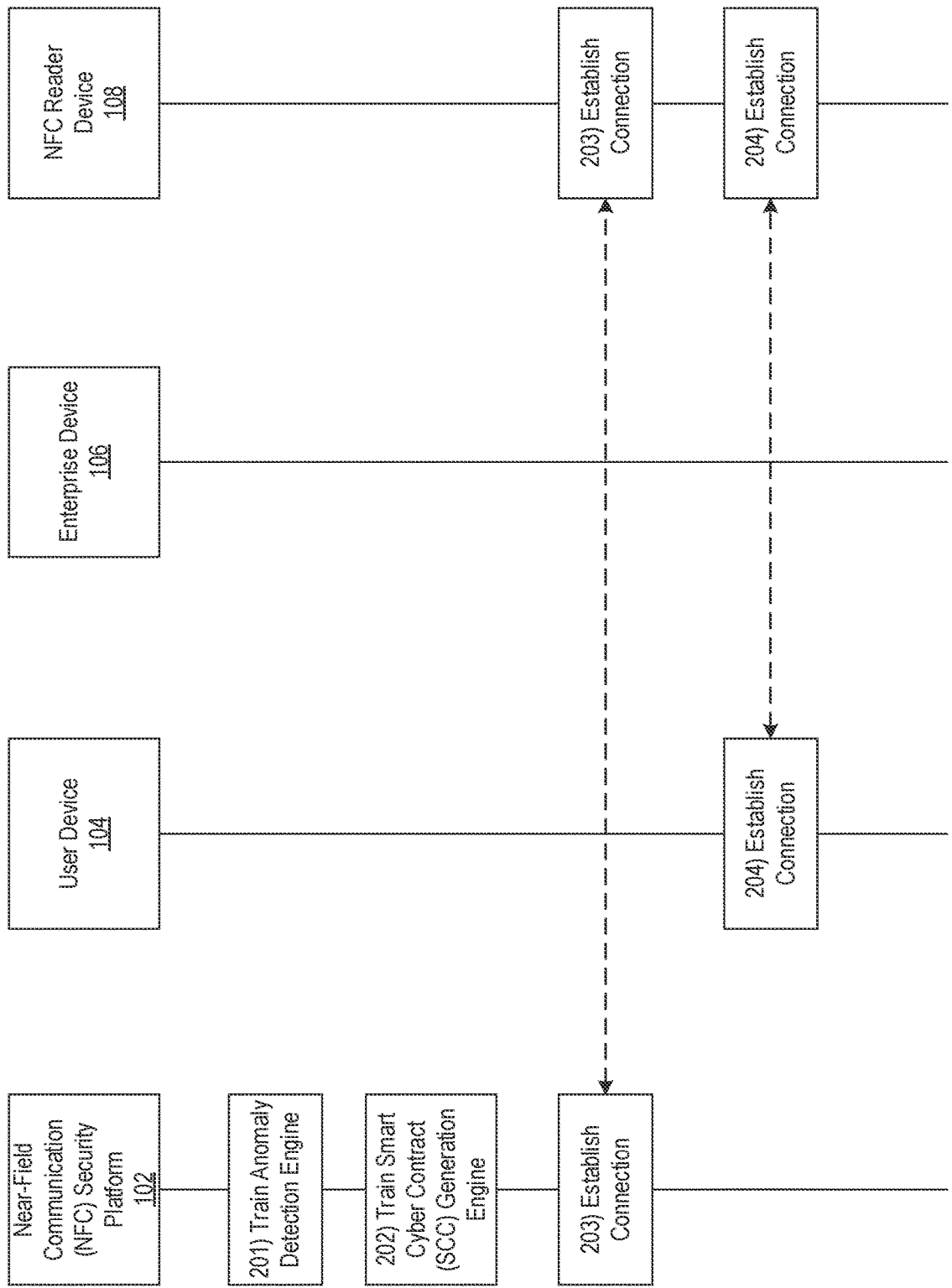

FIGS. 2A-2E depict an illustrative event sequence for providing NFC security using smart contract generation for a zero-trust network architecture in accordance with one or more example arrangements. Referring to FIG. 2A, at step 201, the NFC security platform 102 may train an anomaly detection engine to output suspicion indications for event processing requests based on event processing information associated with an event processing request. In some instances, the NFC security platform 102 may configure and/or otherwise train the anomaly detection engine based on a training set of historical user information (which may, e.g., be stored in internal memory of the NFC security platform 102, such as memory 112, and/or external memory). The historical user information may include information associated with one or more maintained profiles (e.g., profiles of customers maintained by the enterprise organization associated with NFC security platform 102, and/or other profiles) corresponding to event processing requests (e.g., average account balance, average values associated with event processing requests, records of previous event processing requests, common third parties involved in previous event processing requests (e.g., commercial vendors, such as a commercial vendor associated with NFC reader device 108, or the like), one or more certificates associated with different users, user behavioral patterns, and/or other information). In some instances, to configure and/or otherwise train the anomaly detection engine, the NFC security platform 102 may process the training set of historical user information by applying natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques. In doing so, the NFC security platform 102 may train the anomaly detection engine to output suspicion indications based on input of event processing information.

For example, in configuring and/or otherwise training the anomaly detection engine, the NFC security platform 102 may identify a pattern of user behavior (e.g., a frequency of event processing requests over a period of time, a frequency of event processing requests involving a particular third party (e.g., a commercial vendor, or the like), an average value associated with event processing requests, an average account balance (e.g., of an account maintained by an enterprise organization, such as a financial institution and/or other institution), and/or other patterns of user behavior) associated with a particular user. For instance, the NFC security platform 102 may, based on historical user information associated with the particular user, identify a pattern of user behavior relating to a frequency of event processing requests involving a third party. For example, the NFC security platform 102 may identify an expected frequency, indicating that the particular user sends event processing requests, associated with a particular third party (e.g., a commercial vendor, or the like) a certain number of times in a given period of time (e.g., a week, a month, a year, and/or other periods of time). Accordingly, the NFC security platform 102 may train the anomaly detection engine to generate a suspicion flag indicating an event processing request is suspicious based on the event processing request being received in excess of the expected frequency (e.g., if the expected frequency is two requests in a week, the NFC security platform 102 may train the anomaly detection engine to flag a third request in the same week as suspicious or potentially suspicious).

Additionally or alternatively, in some examples, the NFC security platform 102 may identify that the particular user exhibits a pattern of remaining below a threshold number of event processing requests in a given period of time. For example, the NFC security platform 102 may identify that the particular user sends, on average, less than thirty total event processing requests in a week. Accordingly, the NFC security platform 102 may train the anomaly detection engine to generate a suspicion flag indicting an event processing request is suspicious or potentially suspicious based on event processing information corresponding to the event processing request indicating this is the fiftieth event processing request sent by the particular user in a week.

Additionally or alternatively, in configuring and/or otherwise training the anomaly detection engine the NFC security platform 102 may input the training set of historical user information into the anomaly detection engine. Based on inputting the training set of historical user information into the anomaly detection engine, the NFC security platform 102 may identify a correlation between a particular user (e.g., a customer of the enterprise organization, and/or other users) and a personal certificate (e.g., a digital certificate identifying the user, such as described below at step 207, and/or other personal certificates). For example, the NFC security platform 102 may mine the training set of historical user information to identify that a first personal certificate (which may, e.g., have previously been generated by the NFC security platform 102, as described below at step 207) corresponds to a first user (e.g., based on a stored digital handshake between the first personal certificate and a user device associated with the first user). The NFC security platform 102 may then configure and/or otherwise train the anomaly detection engine to generate a suspicion indication flagging an event processing request as suspicious or potentially suspicious based on identifying that a user associated with the event processing request does not correspond to a personal certificate associated with the event processing request. For example, the NFC security platform 102 may store a correlation between the first user and the first personal certificate. It should be noted that the above are merely a few example methods by which the NFC security platform 102 may train the anomaly detection engine and that the NFC security platform 102 may additionally and/or alternatively configure and/or otherwise train the anomaly detection engine based on additional user information (e.g., user passwords, device identifiers, internet protocol (IP) addresses, and/or other user information) and/or other information of the training set of historical user information.

At step 202, the NFC security platform 102 may train an SCC generation engine to output SCCs based on input of maintained profile information. In some instances, the NFC security platform 102 may configure and/or otherwise train the SCC generation engine based on a training set of historical user information and/or a training set of historical event processing rules (which may, e.g., be stored in internal memory of the NFC security platform 102, such as memory 112, and/or external memory). In some instances, the historical user information may be and/or include the historical user information used to train the anomaly detection engine as described above at step 201. In some examples, the historical user information may include additional user information to the training set of historical user information used to train the SCC generation engine. The historical user information may be and/or include information associated with one or more maintained profiles (e.g., profiles of customers maintained by the enterprise organization associated with NFC security platform 102, and/or other profiles) corresponding to event processing requests (e.g., average account balance, average values associated with event processing requests, records of previous event processing requests, common third parties involved in previous event processing requests (e.g., commercial vendors, such as a commercial vendor associated with NFC reader device 108, or the like), records of one or more historical SCCs associated with a user, user behavioral patterns, and/or other information). The set of historical event processing rules may be and/or include rules governing the approval of event processing requests. For example, the set of historical event processing rules may be and/or include rules controlling which devices are permitted to send event processing requests associated with a particular user, rules controlling which users are permitted to send event processing requests associated with a particular maintained profile and/or account, rules related to particular event processing information for an associated event processing request (e.g., a limit on a value that may be associated with an event processing request, a limit on a number of event processing requests that may be allowed in a particular period of time, a required account balance to approve an event processing request, and/or other rules related to particular event processing information) and/or other rules.

In some instances, to configure and/or otherwise train the SCC generation engine, the NFC security platform 102 may process the training set of historical user information and the training set of historical event processing rules by applying natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques. In doing so, the NFC security platform 102 may train the SCC generation engine to output SCCs based on input of maintained profile information.

For example, in configuring and/or otherwise training the SCC generation engine, the NFC security platform 102 may identify an association between one or more maintained profiles and one or more previously generated SCCs (which may, e.g., have previously been generated by NFC security platform 102 and using the SCC generation engine). For instance, the NFC security platform 102 may, based on historical user information associated with a particular user, identify a historical SCC previously generated in response to an event processing request associated with the particular user. Accordingly, the NFC security platform 102 may train the SCC generation engine to generate an SCC including similar rules to the historical SCC for event processing requests associated with the particular user. Additionally or alternatively, the NFC security platform 102 may train the SCC generation engine to dynamically update the historical SCC based on updated user information (which may, e.g., be received by the NFC security platform 102 and stored in internal memory, such as memory 112, and/or external memory). For example, the NFC security platform 102 may train the SCC generation engine to generate a new, updated SCC including one or more event processing rules from the historical SCC and one or more new event processing rules based on the updated user information, in response to input of maintained profile information corresponding to the particular user.

Additionally or alternatively, in configuring and/or otherwise training the anomaly detection engine the NFC security platform 102 may input the training set of historical user information and/or the training set of historical event processing rules into the SCC generation engine. Based on inputting one or both of the training sets into the SCC generation engine, the NFC security platform 102 may identify a correlation between a particular user (e.g., a customer of the enterprise organization who may, e.g., be associated with a maintained profile, and/or other users) and one or more event processing rules. For example, the NFC security platform 102 may mine the training set of historical user information and mine the training set of historical event processing rules to identify that a particular user corresponds to one or more particular event processing rules. The NFC security platform 102 may then configure and/or otherwise train the SCC generation engine to generate an SCC including the one or more particular event processing rules based on input of maintained profile information identifying the particular user. For example, the NFC security platform 102 may store a correlation between the particular user and the one or more particular event processing rules. It should be noted that the above are merely a few exemplary methods by which the NFC security platform 102 may train the SCC generation engine and that the NFC security platform 102 may additionally and/or alternatively configure and/or otherwise train the SCC generation engine based on additional user information (e.g., user permissions, account manager permissions, agreements between a user and an enterprise organization, and/or additional user information) and/or other information of the training set of historical user information and/or of the training set of historical event processing rules.

At step 203, the NFC security platform 102 may establish a connection with NFC reader device 108. For example, NFC security platform 102 may establish a first wireless data connection with the NFC reader device 108 to link the NFC reader device 108 with the NFC security platform 102 (e.g., in preparation for intercepting event processing requests, and/or other functions). In some instances, the NFC security platform 102 may identify whether or not a connection is already established with the NFC reader device 108. If a connection is already established with the NFC reader device 108, the NFC security platform 102 might not re-establish the connection. If a connection is not yet established with the NFC reader device 108, the NFC security platform 102 may establish the first wireless data connection as described above.

At step 204, the user device 104 may establish a connection with NFC reader device 108. For example, user device 104 may establish a second wireless data connection with the NFC reader device 108 to link the NFC reader device 108 with the user device 104 (e.g., in preparation for sending event processing requests, and/or other functions). In some instances, the user device 104 may identify whether or not a connection is already established with the NFC reader device 108. If a connection is already established with the NFC reader device 108, the user device 104 might not re-establish the connection. If a connection is not yet established with the NFC reader device 108, the user device 104 may establish the second wireless data connection as described above.

Figure 2B:
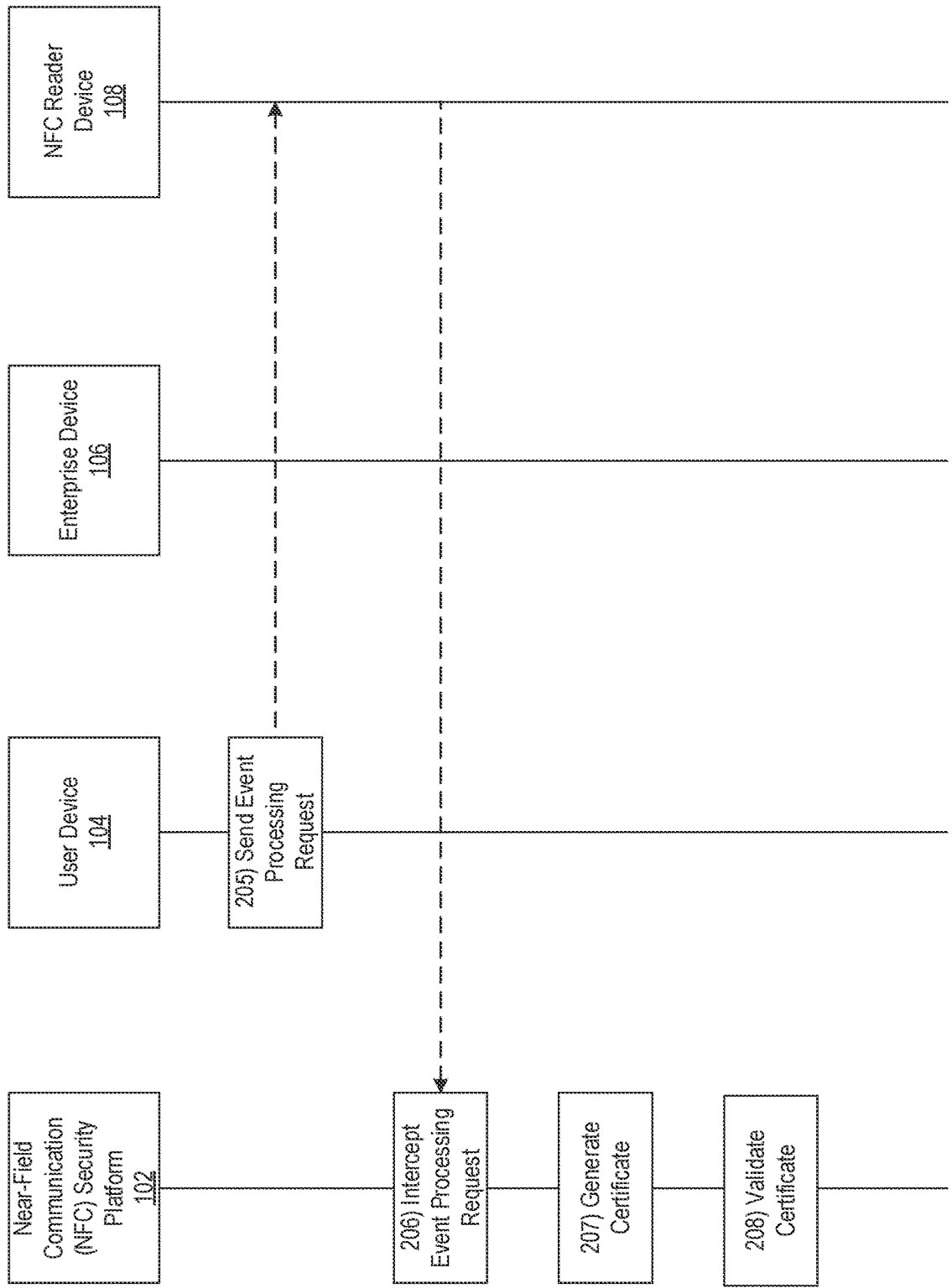

Referring to FIG. 2B, at step 205, the user device 104 may send an event processing request to NFC reader device 108. The event processing request may be and/or include a request to access particular information corresponding to the user of user device 104 (e.g., account information, or the like), perform a financial transaction, and/or other event processing requests. The event processing request may include event processing information required to process the event (e.g., identifying information of the user, such as a link to a maintained profile and/or other identifying information, identifying information of the user device, such as an IP address, information related to the event processing request (e.g., a value corresponding to the requested event, a recipient of the event processing request, a source of the event processing request, and/or other information) and/or other information). Additionally or alternatively, in some instances, the event processing request may be and/or include a certificate identifying the user initiating the event processing request (which may, e.g., have previously been generated by the NFC security platform 102, as described at step 207 below). In sending the event processing request, the user device 104 may send the event processing request via one or more communication interfaces. For example, the user device 104 may send the event processing request via a near-field communication antenna and/or other communication interface and while the second wireless data connection is established.

At step 206, the NFC security platform 102 may intercept the event processing request. For example, the NFC security platform 102 may intercept the event processing request sent by user device 104, as described above at step 205. In some instances, in intercepting the event processing request, the NFC security platform 102 may monitor traffic to the NFC reader device 108 until an event processing request is detected. Based on detecting an event processing request, the NFC security platform 102 may send one or more commands to cause the event processing request to be routed to the NFC security platform 102 instead of the NFC reader device 108. For example, the NFC security platform 102 may send the one or more commands to the NFC reader device 108 via the communication interface 113 and while the first wireless data connection is established. Additionally or alternatively, in some instances, the NFC security platform 102 may configure and/or otherwise cause the NFC reader device 108 to route all event processing requests to the NFC security platform 102 prior to taking any further action regarding an event processing request. In intercepting the event processing request, the NFC security platform 102 may store the event processing request to local memory, such as memory 112, and/or external memory.

At step 207, based on intercepting the event processing request, the NFC security platform 102 may generate a certificate. In some instances, the certificate may be a personal certificate corresponding to the user device that sent the event processing request (e.g., user device 104, and/or other user devices) and/or corresponding to the user associated with the user device. In some instances, in generating the certificate, the NFC security platform 102 may access user information (e.g., a maintained profile which may, e.g., be maintained by the enterprise organization associated with NFC security platform 102, and/or other user information) to generate a certificate indicating the personal identity of the user. For example, the NFC security platform 102 may access a maintained profile to identify one or more devices (e.g., mobile phones, personal computers, laptops, smart watches, or the like) that the user associated with the event processing request has previously authenticated. Based on identifying the one or more devices, the NFC security platform 102 may generate a digital certificate that identifies valid devices from which the user may send an event processing request. The certificate may include one or more authentication mechanisms which may, e.g., be used to authenticate the user as the source of an event processing request. For example, the certificate may include a secure shell handshake protocol, a secure socket layer handshake protocol, public and/or private key, and/or other authentication mechanisms. In some instances, the NFC security platform 102 may identify that the event processing request already is and/or includes a certificate which may, e.g., have previously been generated by the NFC security platform 102. In these instances, the NFC security platform 102 might not generate a new certificate.

At step 208, the NFC security platform 102 may validate a certificate associated with the event processing request (e.g., the certificate generated above at step 207, and/or other certificates). In validating the certificate, the NFC security platform 102 may compare some or all of the information included in the certificate to a maintained profile (which may, e.g., be maintained by the enterprise organization and stored in internal memory of the NFC security platform 102, such as memory 112, and/or external memory). For example, the NFC security platform 102 may use one or more authentication mechanisms included in the certificate to authenticate that the user associated with the event processing request (e.g., the user of user device 104) is an authorized user. In authenticating whether the user is an authorized user, the NFC security platform 102 may initiate a digital handshake, reference a public or private key, and/or otherwise authenticate that the user is an authorized user permitted to request the event associated with the event processing request. By validating the certificate associated with the event processing request, the NFC security platform 102 may confirm that the user (e.g., the user of user device 104) is authorized to send event processing requests which include event processing information associated with the user corresponding to the maintained profile. For example, the NFC security platform 102 may confirm that the user of user device 104 is authorized to send an event processing request requesting access to an account (which may, e.g., be maintained by the enterprise organization associated with NFC security platform 102) in order to process an event.

Figure 2C:
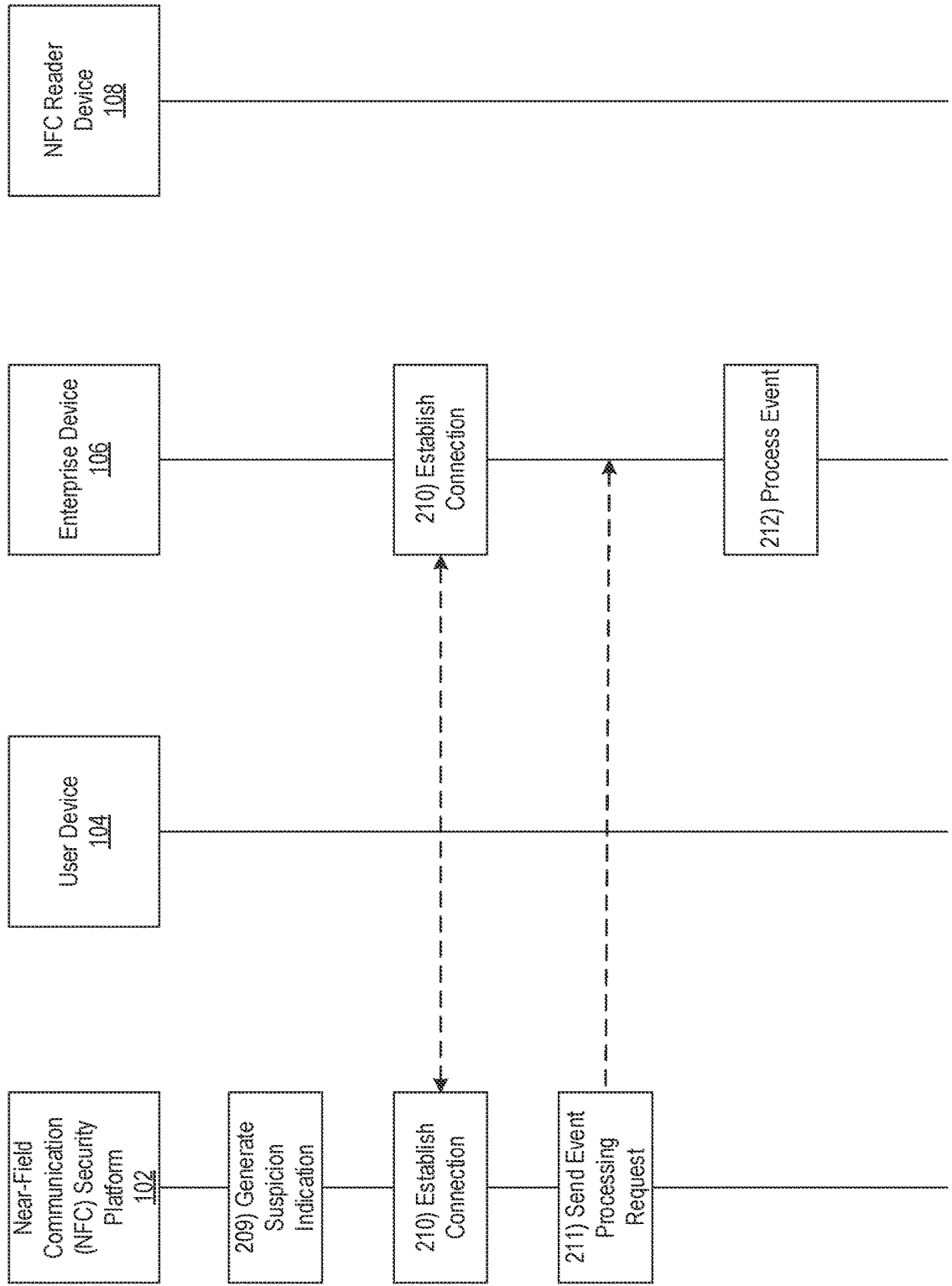

Referring to FIG. 2C, at step 209, the NFC security platform 102 may generate a suspicion indication for the event processing request based validating the certificate. The NFC security platform 102 may generate the suspicion indication based on the event processing information included in the event processing request (e.g., identifying information of the user, such as a link to a maintained profile and/or other identifying information, identifying information of the user device, such as an IP address, information related to the event processing request (e.g., a value corresponding to the requested event, a recipient of the event processing request, a source of the event processing request, and/or other information) and/or other information). In generating the suspicion indication, the NFC security platform 102 may input the event processing information into the anomaly detection engine. In generating the suspicion indication, based on inputting the event processing information into the anomaly detection engine, the NFC security platform 102 may use some or all of the training set of historical user information (e.g., described above at step 201). For example, the NFC security platform 102 may cause the anomaly detection engine to compare some or all of the event processing information to some or all of the historical user information. In some examples, based on the comparison, the NFC security platform 102 may cause the anomaly detection engine to generate a binary suspicion indication (e.g., "1" is suspicious or potentially suspicious, "0" if not suspicious). For example, the anomaly may compare event processing information indicating the event processing request is the fortieth event processing request sent from the user device (e.g., user device 104, and/or other user devices) in a particular period of time (e.g., a day, a week, a month, and/or other periods of time) with historical user information indicating the user associated with the user device exhibits a pattern of sending less than thirty event processing requests from the user device within the particular period of time. Based on this comparison, the NFC security platform 102 may cause the anomaly detection engine to generate a suspicion indication with a binary value of "1", which may indicate that the event processing request is suspicious.

Additionally or alternatively, in some instances, based on comparing some or all of the event processing information to some or all of the historical user information, the anomaly detection engine may generate the suspicion indication as a confidence score (which may, e.g., be an integer value, a percentage value, a decimal value, and/or any other score capable of being generated by a machine learning model). The anomaly detection engine may, in some instances, compare the confidence score to a confidence threshold to generate a suspicion indication indicating whether or not the event processing request is suspicious.

For example, based on comparing some or all of the event processing information to some or all of the historical user information, the anomaly detection engine may identify a number and/or percentage of suspicion factors (e.g., a discrepancy between a subset of the event processing information in the event processing request and a corresponding subset of the historical user information, and/or other suspicion factors). In some examples, the anomaly detection engine may have been configured to detect any number of unique suspicion factors (e.g., ten, twenty, fifty, 100, 1000, and/or any other number) by the enterprise organization associated with NFC security platform 102 (e.g., by an employee of the enterprise organization and/or a computer program configured by the enterprise organization). For example, based on the comparison, the anomaly detection engine may identify two suspicion factors, such as, in one or more examples: a discrepancy between the user device that sent the event processing request and a list of authorized user devices included in the historical event, a discrepancy in the location of the user device that sent the event processing request and a zip code or other known location information associated with the user, and/or other suspicion factors. In these examples, the anomaly detection engine may have been configured to detect, e.g., ten unique suspicion factors.

Accordingly, in this example, the anomaly detection engine may generate a confidence score of twenty percent, because two of the ten unique suspicion factors were identified. Based on comparing the confidence score to a confidence threshold satisfied by confidence scores greater than fifty percent, the anomaly detection engine may identify that the suspicion indication indicates that the event processing request is not suspicious. Additionally or alternatively, in another example, the anomaly detection engine may identify eight suspicion factors (e.g., using the method described above). In these examples, the anomaly detection engine may have again been configured to detect ten unique suspicion factors. Accordingly, the anomaly detection engine may generate a confidence score of eighty percent. Based on comparing the confidence score to a confidence threshold satisfied by confidence scores greater than fifty percent, the anomaly detection engine may identify that the suspicion indication indicates that the event processing request is suspicious.

Additionally or alternatively, in some examples, the NFC security platform 102 may have previously trained the anomaly detection engine to employ an anomaly detection algorithm to generate suspicion indications. For example, the anomaly detection engine may execute the anomaly detection algorithm using the following constraints/parameters:

$$\text{If (sum of detected suspicion factors)} \leq \frac{\text{(total possible suspicion factors)}}{2},$$

$$\text{then: suspicion indication} = \text{not suspicious. If else,}$$

$$\text{then: suspicion indication} = \text{suspicious.}$$

In this example, if the sum of the suspicion factors (e.g., the suspicion factors described above) detected by the anomaly detection engine is less than or equal to half of the total possible suspicion factors, then the anomaly detection engine will generate a suspicion indication indicating that the event processing request is not suspicious (e.g., a binary value of "0", and/or other indications that the event processing request is suspicious). Else, the anomaly detection engine will generate a suspicion indication indicating that the event processing request is suspicious (e.g., a binary value of "1", and/or other indications that the event processing request is suspicious). Note that the above example is merely one algorithm the anomaly detection engine may be trained to employ in order to generate the suspicion indication and in one or more instances additional or alternative algorithms may be employed and/or may correspond to different parameters.

It should be understood that while the above description refers to a single suspicion indication, the NFC security platform 102 may perform the functions described above for a plurality of event processing requests in additional iterations of the methods of providing NFC security described herein. For example, in some instances, the NFC security platform 102 may intercept a first event processing request, generate a first certificate, and generate, based on validating the ticket, a first suspicion indication that indicates the event processing request is suspicious (e.g., using the functions as described above at steps 206-209). In some examples, the NFC security platform 102 may intercept a second event processing request, generate a second certificate, and generate, based on validating the ticket, a second suspicion indication that indicates the event processing request is not suspicious (e.g., using the same functions as described above at steps 206-209).

In some instances, based on a suspicion indication indicating that the event processing request is not suspicious (i.e., the event processing request is safe), the NFC security platform 102 may cause the event processing request to be processed (e.g., as described below at steps 210-212) and might not perform the actions described at steps 213-216. In some examples, based on a suspicion indication that the event processing request is suspicious, the NFC security platform 102 may proceed to step 213 and might not perform the actions described at steps 210-212, or might not perform the actions described at steps 210-212 until a later point in time.

At step 210, based on a suspicion indication indicating that the event processing request is not suspicious, the NFC security platform 102 may establish a connection with the enterprise device 106. For example, NFC security platform 102 may establish a third wireless data connection with the enterprise device 106 to link the enterprise device 106 with the NFC security platform 102 (e.g., in preparation for sending event processing requests, and/or other functions). In some instances, the NFC security platform 102 may identify whether or not a connection is already established with the enterprise device 106. If a connection is already established with the enterprise device 106, the NFC security platform 102 might not re-establish the connection. If a connection is not yet established with the enterprise device 106, the NFC security platform 102 may establish the third wireless data connection as described above.

At step 211, the NFC security platform 102 may send the event processing request (i.e., the event processing request intercepted at step 206, as described above) to the enterprise device 106. For example, the NFC security platform 102 may send the event processing request via the communication interface 113 and while the third wireless data connection is established. In some instances, in sending the event processing request, the NFC security platform 102 may additionally send the suspicion indication to cause the enterprise device 106 to process the event processing request. Additionally or alternatively, in some instances, the NFC security platform 102 may additionally send one or more commands directing the enterprise device 106 to process the event processing request.

At step 212, based on receiving the event processing request from NFC security platform 102, the enterprise device 106 may process the event processing request. For example, the enterprise device 106 may analyze the event processing information included in the event processing request and initiate one or more functions to execute the event processing request. In some instances, the enterprise device 106 may send one or more messages to the NFC security platform 102 (e.g., via the communication interface 113 and while the third wireless data connection is established) indicating that the event processing request has been processed.

Figure 2D:
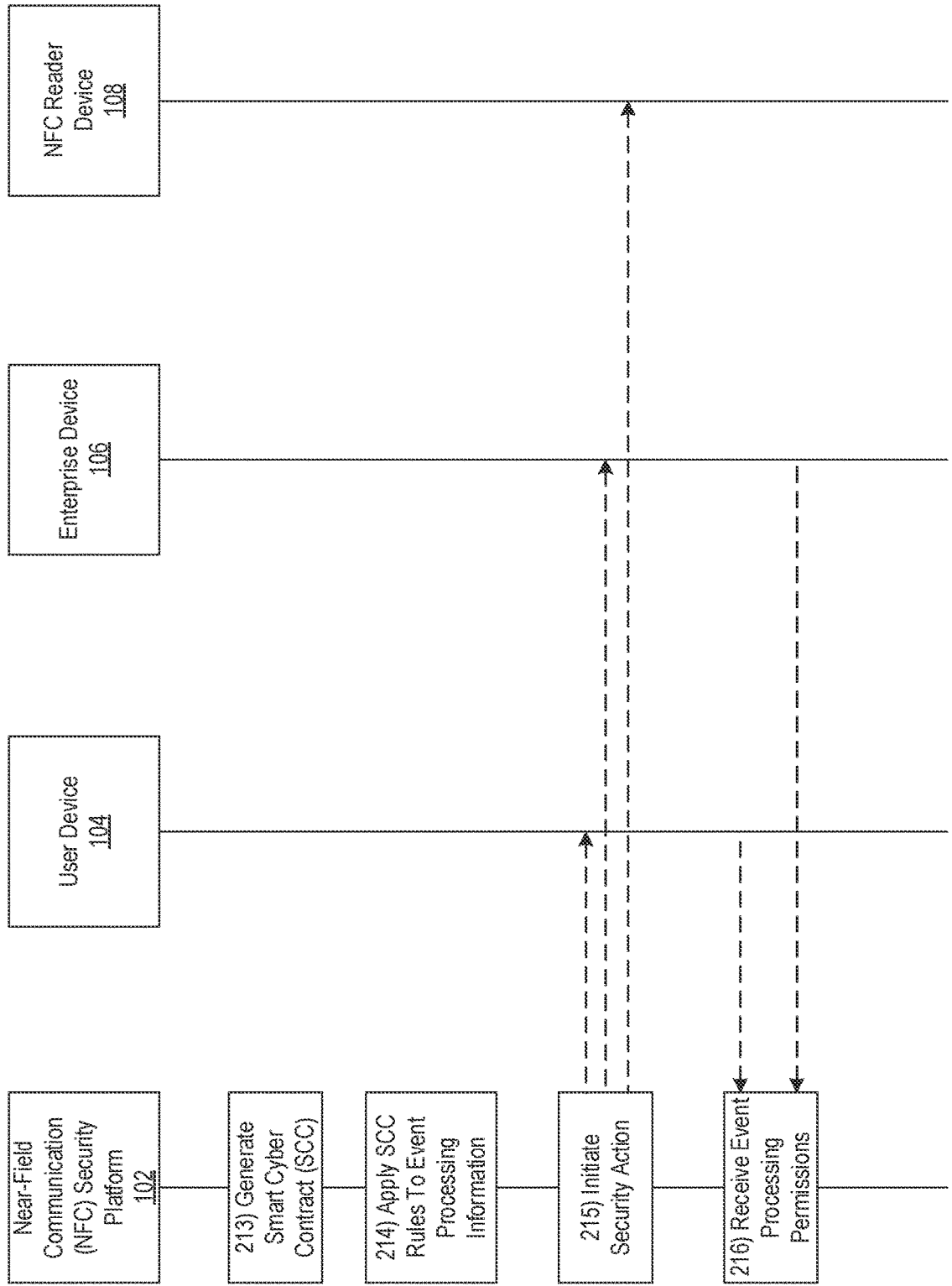

Referring to FIG. 2D, at step 213, the NFC security platform 102 may generate a smart cyber contract (SCC) based on a suspicion indication indicating that the event processing request is suspicious. The SCC may be a cyber contract, capable of dynamic updating, that includes one or more rules controlling processing of event processing requests and/or one or more protocols controlling communication of event processing requests. The SCC may be generated by the SCC generation engine based on input of information from NFC security platform 102. For example, the NFC security platform 102 may generate the SCC by inputting maintained profile information into the SCC generation engine. The maintained profile information (e.g., average account balance, average values associated with event processing requests, records of previous event processing requests, common third parties involved in previous event processing requests (e.g., commercial vendors, such as a commercial vendor associated with NFC reader device 108, or the like), records of one or more historical SCCs associated with a user, user behavioral patterns, and/or other information) may be and/or include a subset of the event processing information of the event processing request. In generating the SCC, based on inputting the maintained profile information into the SCC generation engine, the NFC security platform 102 may use some or all of the training set of historical user information (e.g., described above at step 202) and/or some or all of the training set of historical event processing rules (e.g., as further described above at step 202).

For example, the NFC security platform 102 may cause the SCC generation engine to simultaneously or near-simultaneously compare some or all of the maintained profile information to some or all of the historical user information and some or all of the historical event processing rules. In some examples, based on the comparison, the NFC security platform 102 may cause the SCC generation engine to generate an SCC. For example, the SCC generation engine may compare maintained profile information indicating the event processing request was sent from a particular user device (e.g., user device 104, and/or other user devices) with historical user information indicating the user associated with the user device was and/or is subject to a historical event processing rule limiting a number of event processing requests that may be sent from the particular user device in a particular period of time (e.g., a week, a month, a year, and/or other periods of time). In such an example, the SCC generation may simultaneously or near-simultaneously compare the maintained profile information to a historical event processing rule indicating the limit is thirty event processing requests in the particular period of time. Based on these comparisons, the NFC security platform 102 may cause the SCC generation engine to generate an SCC that includes the same rule (e.g., a rule indicating the limit is thirty event processing requests in the particular period of time). It should be understood that the above description is merely one example and the NFC security platform 102 may cause the SCC generation engine to generate an SCC that includes one or more rule other than, or in addition to, the above described rule. In these examples, the one or more rules may similarly have been included in a previous SCC associated with the user of the user device (which SCCs may, e.g., have previously been generated by NFC security platform 102).

Additionally or alternatively, in some instances, in generating the SCC the NFC security platform 102 may cause the SCC to dynamically update an existing SCC based on receiving updated event processing rules. For example, the NFC security platform 102 may have previously been configured to receive updates to event processing rules associated with a particular user. The NFC security platform 102 may receive the updates from an employee of the enterprise organization (e.g., via an enterprise user device, such as enterprise device 106 and/or other enterprise user devices) and/or from a customer of the enterprise organization (e.g., via the user device 104, and/or other user devices). In these instances, the NFC security platform 102 may cause the SCC generation engine to mine the updated event processing rules for event processing rules corresponding to the maintained profile information input to the SCC generation engine. Accordingly, based on identifying at least one updated event processing rule corresponding to the maintained profile information, the NFC security platform 102 may cause the SCC generation engine to generate an SCC including the at least one updated event processing rule.

It should be understood that while the above description refers to a single SCC being generated, the NFC security platform 102 may perform the functions described above for a plurality of event processing requests in additional iterations of the methods of providing NFC security described herein. For example, in some instances, the NFC security platform 102 may generate a first SCC for a first event processing request, based on a first suspicion indication identifying an event processing request as suspicious (e.g., using the methods described above). Additionally, in some examples, the NFC security platform 102 may generate a second SCC, different from the first SCC, for a second event processing request, based on a second suspicion indication identifying an event processing request as suspicious (e.g., using the methods described above).

At step 214, the NFC security platform 102 may apply the rules included in the SCC to the event processing information of the event processing request. For each rule applied to the event processing information, the NFC security platform 102 may determine whether the rule is satisfied. In applying the rules to the event processing information, the NFC security platform 102 may apply each rule to specific event processing information that corresponds to the rule. For example, in applying a rule, e.g., restricting which devices are authorized to process event processing requests associated with a particular user profile, the NFC security platform 102 may apply the rule to identifying information of the device (e.g., user device 104, and/or other devices) that sent the event processing request. In these examples, based on identifying that the device that sent the event processing request is not on a list of authorized devices, the NFC security platform 102 may identify that the rule is not satisfied. In other examples, in applying a rule, e.g., requiring the device sending the event processing request to utilize a particular communication protocol and/or handshake, the NFC security platform 102 may identify whether or not the device utilizes the particular protocol and/or handshake. Based on identifying that the device utilizes the particular protocol and/or handshake, the NFC security platform 102 may identify that the rule is satisfied.

In some instances, based on identifying that every rule included in the SCC has been satisfied, the NFC security platform 102 may cause the event processing request to be processed (e.g., as described above at steps 210-212) and might not perform the actions described at steps 215-218. In some examples, based on identifying that the event processing information fails to satisfy at least one rule of the SCC, the NFC security platform 102 may proceed to step 215 and initiate one or more security actions, and may not process the event processing request.

At step 215, the NFC security platform 102 may initiate one or more security actions based on identifying that the event processing information fails to satisfy at least one rule of the SCC. The one or more security actions may affect one or more additional devices (e.g., user device 104, enterprise device 106, NFC reader device 108, and/or other devices). The one or more security actions may include outputting a suspicion notification, denying the event processing request, outputting a security alert, and/or other security actions designed to prevent and/or address suspicious event processing requests.

In some examples, in initiating the security action, the NFC security platform 102 may output instructions to deny the event processing request. For example, the NFC security platform 102 may send one or more commands (e.g., via the communication interface 113 and while the first wireless data connection is established) to the NFC reader device 108 directing the NFC reader device 108 to deny the event processing request. In these examples, sending the one or more commands may cause the NFC reader device 108 to deny the event processing request (e.g., cancel the request, block the request, and/or otherwise deny the event processing request).

Additionally or alternatively, in some instances, in initiating the security action the NFC security platform 102 may output a security alert. For example, the NFC security platform 102 may output the security alert to an event processing entity (e.g., an enterprise organization, such as the enterprise organization associated with the NFC security platform 102, and/or other organizations). The security alert may include one or more of a cellular call, a text alert, a chime, a scroll banner, a ping, and/or other methods of alerting a user device (e.g., enterprise device 106, and/or other user devices). In some examples, the NFC security platform 102 may output the security alert to the event processing entity by sending the security alert to a user device affiliated with the event processing entity, such as enterprise device 106, and/or other user devices. For example, the NFC security platform 102 may send the security alert to, e.g., the enterprise device 106, via the communication interface 113 and while the third wireless data connection is established. In some instances, in sending the security alert to the enterprise device 106, the NFC security platform 102 may additionally send one or more display commands directing the enterprise device 106 to display a user interface. Based on or in response to the one or more display commands, the enterprise device 106 may display the user interface. For example, the enterprise device 106 may display a security alert interface.

For instance, in displaying the security alert interface, the enterprise device 106 may display a graphical user interface similar to security alert interface 300, which is illustrated in FIG. 3. Referring to FIG. 3, in some instances, the security alert interface 300 may include information corresponding to the event processing request and the SCC. For example, the security alert interface 300 may include information such as a notification that the event processing request was flagged as suspicious (e.g., by the anomaly detection engine), an indication that the alert is being received because the SCC was not satisfied in full, the source of the event processing request, a customer and/or user profile associated with the event processing request, a representation of the rules applied to the event processing information, a representation of the rules that were not satisfied, and/or other information. The security alert interface 300 may also display interface elements or selectable options requesting user input. For example, the security alert interface 300 may display one or more of: an information entry field, a button or buttons, toggle or toggles, check box or boxes, and/or other interface elements. For example, as illustrated in FIG. 3, the interface elements may be one or more buttons the user might toggle to update event processing permissions (which may, e.g., update event processing rules associated with the user that initiated the event processing request). In some instances, based on user input updating event processing permissions (e.g., authorized devices, updated limits on the number of event processing requests that may be sent from a particular device, updated limits on account balance thresholds, updated communication protocols, and/or other event processing permissions), the enterprise device 106 may request additional user input indicating which event processing permissions to update (not shown) and may send the updated event processing permissions to the NFC security platform 102. For example, the enterprise device 106 may send the one or more notifications to the NFC security platform 102 via the communication interface 113 and while the third wireless data connection is established.

Referring back to FIG. 2D, at step 215, in some examples, in initiating the security action the NFC security platform 102 may additionally or alternatively output a suspicion notification to user device 104 and/or other user devices. For example, the NFC security platform 102 may output the suspicion notification via the communication interface 113 and while a wireless data connection (which may, e.g., have previously been established between user device 104 and NFC security platform 102). The suspicion notification may be and/or include an alert, chime, scroll banner, ping, and/or other notification which may be displayed by the user device 104. Additionally, in some instances, in sending the suspicion notification, the NFC security platform 102 may additionally send one or more display commands directing the user device 104 to display a user interface. Based on or in response to the one or more display commands, the user device 104 may display the user interface. For example, the user device 104 may display a security alert interface, which may be the same as or similar to the security alert interface 300 depicted in FIG. 3 and described above. In some instances, based on user input updating event processing permissions received in response to displaying the user interface, the user device 104 may send the updated event processing permissions to the NFC security platform 102 (e.g., via the communication interface 113 and while a wireless data connection is established).

At step 216, based on a user device (e.g., user device 104, enterprise device 106, and/or other user devices) sending updated event processing permissions, the NFC security platform 102 may receive the updated event processing permissions. In some instances, based on receiving updated event processing permissions, the NFC security platform 102 may proceed to update the anomaly detection engine and/or the SCC generation engine, as described below at steps 217-218. In some instances, based on identifying that the updated event processing permissions are equivalent to existing event processing permissions, the NFC security platform 102 may not update the anomaly detection engine and/or the SCC generation engine as described below.

Referring to FIG. 2E, at step 217, the NFC security platform 102 may refine, validate, and/or otherwise update the anomaly detection engine. For example, the NFC security platform 102 may update the anomaly detection engine using the event processing information included in the event processing request and/or the event processing permissions. In some instances, updating the anomaly detection engine may include inputting the event processing information included in the event processing request and/or the event processing permissions into the anomaly detection engine. By inputting the event processing information included in the event processing request and/or the event processing permissions into the anomaly detection engine, the NFC security platform 102 may create an iterative feedback loop that may continuously and dynamically refine the anomaly detection engine to improve its accuracy. For example, based on inputting an event processing permission authorizing a new user device to send event processing requests and event processing information identifying the new user device, the NFC security platform 102 may cause the anomaly detection engine to determine future suspicion indications for future event processing requests by comparing event processing information identifying the user device sending a future event processing request to the identifying information of the new user device. In these examples, based on identifying that the user device sending the future event processing request is the new user device, the anomaly detection engine may generate a suspicion indication indicating that the future event processing request is not suspicious.

In updating the anomaly detection engine, the NFC security platform 102 may improve the accuracy and effectiveness of the anomaly detection and suspicion indication generation processes, which may, e.g., result in more efficient training of machine learning models trained by the NFC security platform 102 (and may in some instances, conserve computing and/or processing power/resources in doing so). The NFC security platform 102 may further prevent valid event processing requests from being flagged as suspicious in future iterations of the feedback loop, based on updating the anomaly detection engine.

At step 218, the NFC security platform 102 may refine, validate, and/or otherwise update the SCC generation engine. For example, the NFC security platform 102 may update the SCC generation engine using the SCC generated at step 213 and/or the event processing permissions. In some instances, updating the SCC generation engine may include inputting the SCC and/or the event processing permissions into the SCC generation engine. By inputting the SCC and/or the event processing permissions into the SCC generation engine, the NFC security platform 102 may create an iterative feedback loop that may continuously and dynamically refine the SCC generation engine to improve its accuracy. In some examples, the iterative feedback loop may include the SCC generation engine dynamically updating an existing SCC (e.g., the SCC generated at step 213, and/or other SCCs) based on the event processing permissions. For example, based on inputting an event processing permission requiring event processing requests associated with a particular user (e.g., the user of user device 104, and/or other users) communicate using a particular protocol and event processing information identifying the user device (e.g., user device 104, and/or other user devices) utilizes the particular protocol, the NFC security platform 102 may cause the SCC generation engine to generate a new SCC, and/or update an existing SCC, for a future event processing request by including a rule requiring the particular protocol be utilized in communicating the future event processing request in the new and/or existing SCC.

In updating the SCC generation engine, the NFC security platform 102 may improve the accuracy and effectiveness of the SCC generation process, which may, e.g., result in more efficient training of machine learning models trained by the NFC security platform 102 (and may in some instances, conserve computing and/or processing power/resources in doing so). The NFC security platform 102 may further provide dynamically updated SCCs, based on updating the SCC generation engine.

Figure 4:
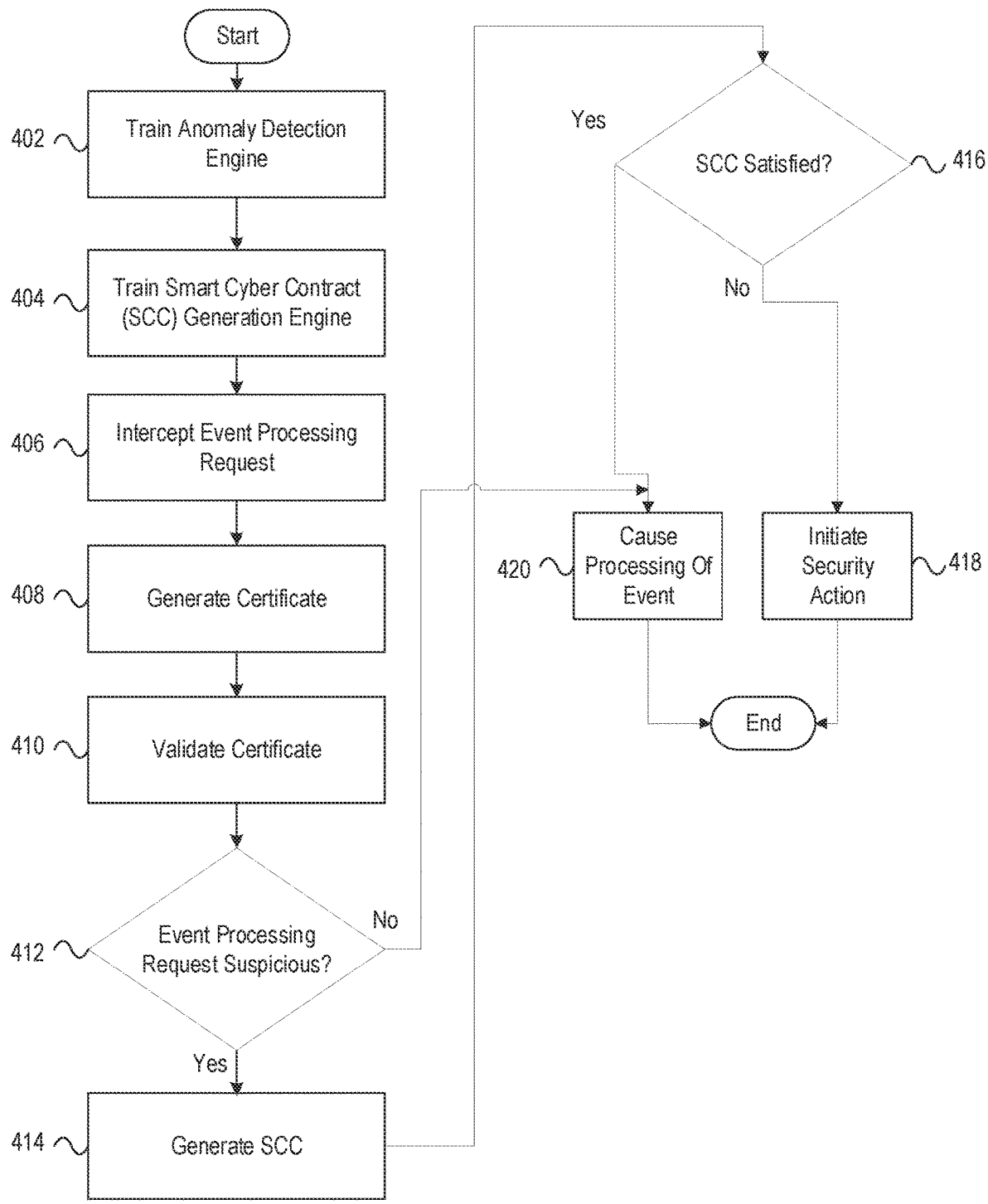
FIG. 4 depicts an illustrative method for providing NFC security using smart cyber contract generation for a zero-trust network architecture in accordance with one or more example arrangements.

FIG. 4 depicts an illustrative method for providing NFC security using smart cyber contract generation for a zero-trust network architecture in accordance with one or more example arrangements. Referring to FIG. 4, at step 402, a computing platform having at least one processor, a communication interface, and memory may train a machine learning model. For example, the computing platform may train an anomaly detection engine. At step 404, the computing platform may train an additional machine learning model. For example, the computing platform may train an SCC generation engine. At step 406, the computing platform may intercept an event processing request sent via near-field communications. At step 408, the computing platform may generate a certificate for a user device based on intercepting the event processing request. At step 410, the computing platform may validate the certificate. At step 412, the computing platform may determine whether the event processing request is suspicious. For example, the computing platform may generate a suspicion indication using the anomaly detection engine. Based on determining that the event processing request is not suspicious, the computing platform may proceed to step 420. Based on determining that the event processing request is suspicious, the computing platform may proceed to step 414.

At step 414, based on determining that the event processing request is suspicious, the computing platform may generate a smart cyber contract. For example, the computing platform may generate the smart cyber contract using the SCC generation engine. At step 416, the computing platform may determine whether the rules of the SCC are satisfied. For example, the computing platform may apply the rules of the SCC to the event processing request. Based on determining that the rules of the SCC are satisfied, the computing platform may proceed to step 420. Based on determining that the rules of the SCC are not satisfied, the computing platform may proceed to step 418. At step 418, based on determining that the rules of the SCC are not satisfied, the computing platform may initiate one or more security actions. Based on initiating the one or more security actions, the computing platform may not proceed to step 420. At step 420, based on determining that the rules of the SCC are satisfied, the computing platform may cause processing of an event. For example, the computing platform may cause processing of the event associated with the event processing request.

One or more aspects of the disclosure may be embodied in computer-usable information or computer-executable instructions, such as in one or more program modules, executed by one or more computers or other devices to perform the operations described herein. Generally, program modules include routines, programs, objects, components, information structures, and the like that perform particular tasks or implement particular abstract information types when executed by one or more processors in a computer or other information processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various arrangements. In addition, the functionality may be embodied in whole or in part in firmware or hardware equivalents, such as integrated circuits, application-specific integrated circuits (ASICs), field programmable gate arrays (FPGA), and the like. Particular information structures may be used to more effectively implement one or more aspects of the disclosure, and such information structures are contemplated to be within the scope of computer executable instructions and computer-usable information described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing information or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative arrangements, one or more of the computing platforms discussed above may be combined into a single computing platform, and the various functions of each computing platform may be performed by the single computing platform. In such arrangements, any and/or all of the above-discussed communications between computing platforms may correspond to information being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to information being accessed, moved, modified, updated, and/or otherwise used by the one or more virtual machines.

Aspects of the disclosure have been described in terms of illustrative arrangements thereof. Numerous other arrangements, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
      train an anomaly detection engine based on historical user information, wherein training the anomaly detection engine configures the anomaly detection engine to output suspicion indications based on input of event processing information;
      train a smart cyber contract (SCC) generation engine based on the historical user information and historical event processing rules, wherein training the SCC generation engine configures the SCC generation engine to output smart cyber contracts based on input of maintained profile information;
      generate a first certificate for a first user device based on intercepting an event processing request from the first user device, wherein the event processing request comprises first event processing information;
      validate the first certificate based on a maintained profile associated with the first user device;
      based on validating the first certificate, input the first event processing information into the anomaly detection engine to generate a suspicion indication;
      generate, based on comparing the first event processing information to the historical user information, a suspicion indication identifying the event processing request as suspicious;
      based on a suspicion indication identifying the event processing request as suspicious, generate a first smart cyber contract by inputting maintained profile information into the SCC generation engine;
      apply one or more rules included in the first smart cyber contract to the first event processing information to determine whether the first event processing information satisfies the one or more rules; and
      based on a determination that the first event processing information fails at least one rule of the one or more rules, initiate a security action.

2. The computing platform of claim 1, wherein the memory stores additional computer-readable instructions that, when executed by the at least one processor, cause the computing platform to:
   receive event processing permissions in response to initiating the security action;
   update the anomaly detection engine based on the first event processing information and the event processing permissions; and
   update the SCC generation engine based on the first event processing information, the first smart cyber contract, and the event processing permissions.

3. The computing platform of claim 1, wherein the memory stores additional computer-readable instructions that, when executed by the at least one processor, cause the computing platform to:
   generate a second certificate for a second user device based on intercepting an event processing request from the second user device, wherein the event processing request from the second user device comprises second event processing information;
   validate the second certificate based on a maintained profile associated with the second user device;
   based on validating the second certificate, input the second event processing information into the anomaly detection engine to generate a second suspicion indication;
   generate, based on comparing the second event processing information to the historical user information, a second suspicion indication identifying the event processing request from the second user device as safe; and
   based on the second suspicion indication, cause processing of the event processing request from the second user device.

4. The computing platform of claim 1, wherein the memory stores additional computer-readable instructions that, when executed by the at least one processor, cause the computing platform to:
  generate a second certificate for a second user device based on intercepting an event processing request from the second user device, wherein the event processing request from the second user device comprises second event processing information;
  validate the second certificate based on a maintained profile associated with the second user device;
  based on validating the second certificate, input the second event processing information into the anomaly detection engine to generate a second suspicion indication;
  generate, based on comparing the second event processing information to the historical user information, a second suspicion indication identifying the event processing request from the second user device as suspicious;
  based on the second suspicion indication identifying the event processing request from the second user device as suspicious, generate a second smart cyber contract by inputting second maintained profile information into the SCC generation engine;
  apply one or more rules included in the second smart cyber contract to the second event processing information to determine whether the second event processing information satisfies the one or more rules included in the second smart cyber contract; and
  based on a determination that the second event processing information satisfies the one or more rules included in the second smart cyber contract, cause processing of the second event processing request.

5. The computing platform of claim 1, wherein the suspicion indication is a binary value.

6. The computing platform of claim 1, wherein the suspicion indication is a confidence score, and wherein the suspicion indication identifies the event processing request as suspicious based on the confidence score satisfying a confidence threshold.

7. The computing platform of claim 1, wherein the memory stores additional computer-readable instructions that, when executed by the at least one processor, cause the computing platform to:
  dynamically update the SCC generation engine based on the computing platform receiving updated event processing rules, wherein updating the SCC generation engine causes the SCC generation engine to output smart cyber contracts comprising one or more updated event processing rules.

8. The computing platform of claim 1, wherein the security action comprises at least one of:
  output of a suspicion notification to the first user device,
  output of instructions to deny the event processing request, or
  output of a security alert to an event processing entity.

9. A method comprising:
  at a computing device comprising at least one processor, a communication interface, and memory:
    training an anomaly detection engine based on historical user information, wherein training the anomaly detection engine configures the anomaly detection engine to output suspicion indications based on input of event processing information;
    training a smart cyber contract (SCC) generation engine based on the historical user information and historical event processing rules, wherein training the SCC generation engine configures the SCC generation engine to output smart cyber contracts based on input of maintained profile information;
    generating a first certificate for a first user device based on intercepting an event processing request from the first user device, wherein the event processing request comprises first event processing information;
    validating the first certificate based on a maintained profile associated with the first user device;
    based on validating the first certificate, inputting the first event processing information into the anomaly detection engine to generate a suspicion indication;
    generating, based on comparing the first event processing information to the historical user information, a suspicion indication identifying the event processing request as suspicious;
    based on a suspicion indication identifying the event processing request as suspicious, generating a first smart cyber contract by inputting maintained profile information into the SCC generation engine;
    applying one or more rules included in the first smart cyber contract to the first event processing information to determine whether the first event processing information satisfies the one or more rules; and
    based on a determination that the first event processing information fails at least one rule of the one or more rules, initiating a security action.

10. The method of claim 9, further comprising, at the computing device:
  receiving event processing permissions in response to initiating the security action;
  updating the anomaly detection engine based on the first event processing information and the event processing permissions; and
  updating the SCC generation engine based on the first event processing information, the first smart cyber contract, and the event processing permissions.

11. The method of claim 9, further comprising, at the computing device:
  generating a second certificate for a second user device based on intercepting an event processing request from the second user device, wherein the event processing request from the second user device comprises second event processing information;
  validating the second certificate based on a maintained profile associated with the second user device;
  based on validating the second certificate, inputting the second event processing information into the anomaly detection engine to generate a second suspicion indication;
  generating, based on comparing the second event processing information to the historical user information, a second suspicion indication identifying the event processing request from the second user device as safe; and
  based on the second suspicion indication, causing processing of the event processing request from the second user device.

12. The method of claim 9, further comprising, at the computing device:
  generating a second certificate for a second user device based on intercepting an event processing request from the second user device, wherein the event processing request from the second user device comprises second event processing information;

validating the second certificate based on a maintained profile associated with the second user device;

based on validating the second certificate, inputting the second event processing information into the anomaly detection engine to generate a second suspicion indication;

generating, based on comparing the second event processing information to the historical user information, a second suspicion indication identifying the event processing request from the second user device as suspicious;

based on the second suspicion indication identifying the event processing request from the second user device as suspicious, generating a second smart cyber contract by inputting second maintained profile information into the SCC generation engine;

applying one or more rules included in the second smart cyber contract to the second event processing information to determine whether the second event processing information satisfies the one or more rules included in the second smart cyber contract; and based on a determination that the second event processing information satisfies the one or more rules included in the second smart cyber contract, causing processing of the second event processing request.

13. The method of claim 9, further comprising, at the computing device:

dynamically updating the SCC generation engine based on the computing device receiving updated event processing rules, wherein updating the SCC generation engine causes the SCC generation engine to output smart cyber contracts comprising one or more updated event processing rules.

14. The method of claim 9, wherein the security action comprises at least one of:

output of a suspicion notification to the first user device, output of instructions to deny the event processing request, or output of a security alert to an event processing entity.

15. One or more non-transitory computer-readable media storing instructions that, when executed by a computing platform comprising at least one processor, a communication interface, and memory, cause the computing platform to:

train an anomaly detection engine based on historical user information, wherein training the anomaly detection engine configures the anomaly detection engine to output suspicion indications based on input of event processing information;

train a smart cyber contract (SCC) generation engine based on the historical user information and historical event processing rules, wherein training the SCC generation engine configures the SCC generation engine to output smart cyber contracts based on input of maintained profile information;

generate a first certificate for a first user device based on intercepting an event processing request from the first user device, wherein the event processing request comprises first event processing information;

validate the first certificate based on a maintained profile associated with the first user device;

based on validating the first certificate, input the first event processing information into the anomaly detection engine to generate a suspicion indication;

generate, based on comparing the first event processing information to the historical user information, a suspicion indication identifying the event processing request as suspicious;

based on a suspicion indication identifying the event processing request as suspicious, generate a first smart cyber contract by inputting maintained profile information into the SCC generation engine;

apply one or more rules included in the first smart cyber contract to the first event processing information to determine whether the first event processing information satisfies the one or more rules; and based on a determination that the first event processing information fails at least one rule of the one or more rules, initiate a security action.

16. The one or more non-transitory computer-readable media of claim 15 storing instructions that, when executed, further cause the computing platform to:

receive event processing permissions in response to initiating the security action;

update the anomaly detection engine based on the first event processing information and the event processing permissions; and update the SCC generation engine based on the first event processing information, the first smart cyber contract, and the event processing permissions.

17. The one or more non-transitory computer-readable media of claim 15 storing instructions that, when executed, further cause the computing platform to:

generate a second certificate for a second user device based on intercepting an event processing request from the second user device, wherein the event processing request from the second user device comprises second event processing information;

validate the second certificate based on a maintained profile associated with the second user device;

based on validating the second certificate, input the second event processing information into the anomaly detection engine to generate a second suspicion indication;

generate, based on comparing the second event processing information to the historical user information, a second suspicion indication identifying the event processing request from the second user device as safe; and based on the second suspicion indication, cause processing of the event processing request from the second user device.

18. The one or more non-transitory computer-readable media of claim 16 storing instructions that, when executed, further cause the computing platform to:

generate a second certificate for a second user device based on intercepting an event processing request from the second user device, wherein the event processing request from the second user device comprises second event processing information;

validate the second certificate based on a maintained profile associated with the second user device;

based on validating the second certificate, input the second event processing information into the anomaly detection engine to generate a second suspicion indication;

generate, based on comparing the second event processing information to the historical user information, a second suspicion indication identifying the event processing request from the second user device as suspicious;

based on the second suspicion indication identifying the event processing request from the second user device as suspicious, generate a second smart cyber contract by inputting second maintained profile information into the SCC generation engine;

apply one or more rules included in the second smart cyber contract to the second event processing information to determine whether the second event processing information satisfies the one or more rules included in the second smart cyber contract; and based on a determination that the second event processing information satisfies the one or more rules included in the second smart cyber contract, cause processing of the second event processing request.

19. The one or more non-transitory computer-readable media of claim 16 storing instructions that, when executed, further cause the computing platform to:

dynamically update the SCC generation engine based on the computing platform receiving updated event processing rules, wherein updating the SCC generation engine causes the SCC generation engine to output smart cyber contracts comprising one or more updated event processing rules.

20. The one or more non-transitory computer-readable media of claim 16, wherein the security action comprises at least one of:

output of a suspicion notification to the first user device, output of instructions to deny the event processing request, or output of a security alert to an event processing entity.

* * * * *